Jan. 16, 1962      A. R. BARRINGER      3,017,567
RECONNAISSANCE ELECTROMAGNETIC SURVEY PACK
Filed Dec. 3, 1957      2 Sheets-Sheet 1
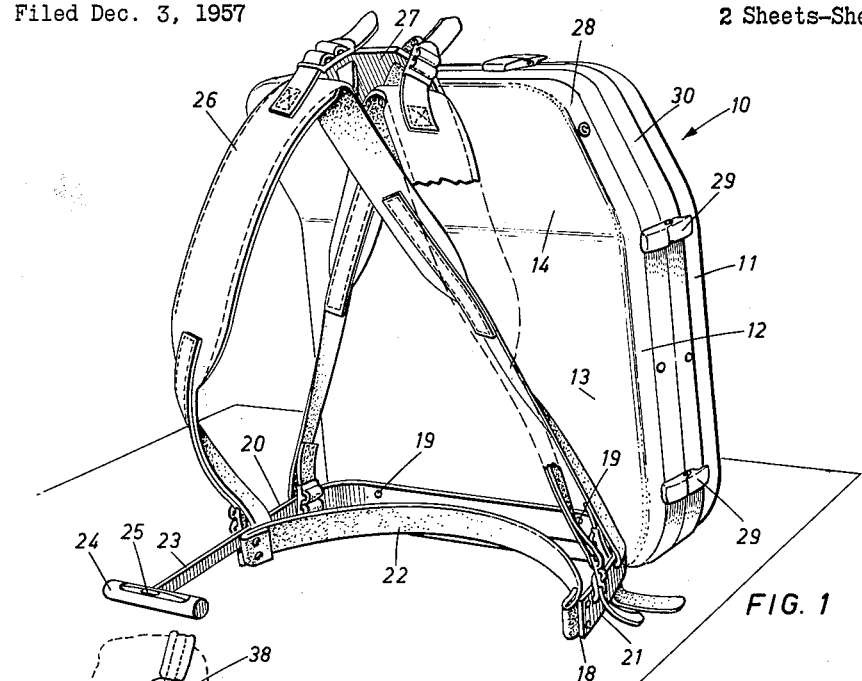
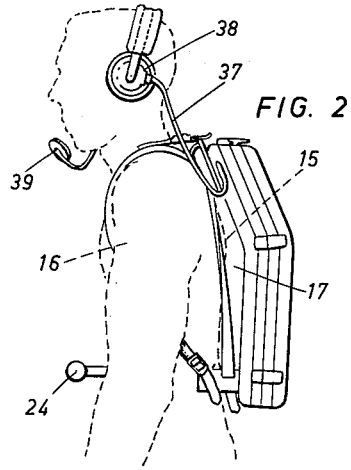
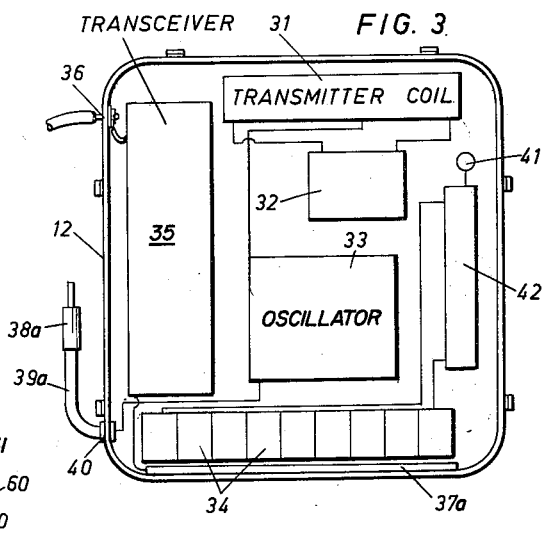
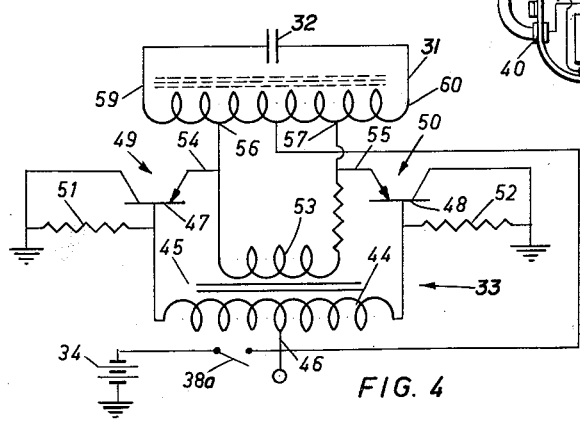
Inventor
ANTHONY R. BARRINGER
by: J. Richard Cavanagh
Patent Agent Jan. 16, 1962 A. R. BARRINGER 3,017,567
RECONNAISSANCE ELECTROMAGNETIC SURVEY PACK
Filed Dec. 3, 1957 2 Sheets-Sheet 2

Inventor
ANTHONY R. BARRINGER
by: J. Richard Cavanaugh
Patent Agent

United States Patent Office 3,017,567
Patented Jan. 16, 1962

3,017,567
RECONNAISSANCE ELECTROMAGNETIC SURVEY PACK
Anthony René Barringer, Agincourt, Ontario, Canada, assignor to Selco Exploration Company Limited
Filed Dec. 3, 1957, Ser. No. 700,438
5 Claims. (Cl. 324—6)

This invention relates to an electro magnetic survey pack adapted to be carried by a single operator as a portable unit useful in electro magnetic survey reconnaissance for the investigation of ore bodies.

Prior apparatus for electro magnetic survey use is characterized by bulky and unwieldy equipment required to be set up and orientated at selected stations. A multiplicity of units is generally involved in the provision of such equipment complicating the transport of equipment by a minimum number of operators. Survey operations are therefore hindered to a considerable degree in rough country, and in particular in dense bush.

It is the main object of the present invention to provide reconnaissance electromagnetic survey apparatus in pack form adapted to be carried by one person which embodies a non-metallic pack structure enclosing an entire transmitter including the signal radiator therefor whereby to enable the entire transmitting apparatus to be transported on the back of a single operator and to be continuously used during transport without stationary set up.

It is a further object of the invention to provide a reconnaissance electromagnetic survey pack as described and containing therein a radio transceiver for communication with a co-operating survey operator.

It is a further object of the invention to provide an electromagnetic survey system and apparatus in which the entire transmitter is adapted to be transported entirely within a pack carried by one operator and a receiver is adapted entirely to be carried by a second operator whereby to provide a comprehensive survey facility by two operators without the requirement of set up stations.

With the foregoing and other objects in view, the apparatus of the invention generally concerns a pack in the form of an arched slab-like structure having a back wall including an upwardly and forwardly inclined portion, and a removable cover for sealing said pack; a pack frame of generally U-shaped form extending forwardly from said back wall, including means engageable with the back of an operator carrying said pack adapted to space the back wall from the back of the operator; strapping means extending from said frame adapted to pass about portions of the body of the operator for support of said pack thereby; and an electro magnetic signal transmitter unit including a signal radiating coil, a transmitter and battery source therefor, disposed entirely within said pack.

Other objects of the invention will be apparent from a study of the following specification taken in conjunction with the accompanying drawings.

In the drawings:

FIGURE 1 is a perspective view of a survey pack in accordance with the invention;

FIGURE 2 is a side illustration of the manner of use of the receiver;

FIGURE 3 is a view of the survey pack of FIGURE 1 with the back cover thereof removed and revealing the contents thereof;

FIGURE 4 is an electric schematic of a transmitting circuit and apparatus of the invention adapted to be entirely enclosed within the pack set forth herein;

FIGURE 9 is a sectional view of an aluminum extrusion support or backing utilized as a heat sink for the electronic circuitry of the transmitter of FIGURE 3.

Figure 5:
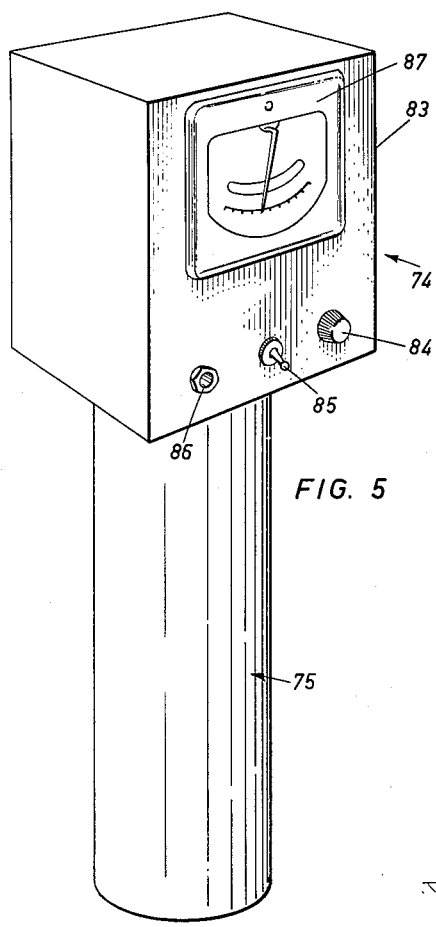
FIGURE 5 is a perspective view of one suitable form of receiver adapted to be carried by a survey partner.

Referring to the drawings, the reconnaissance survey pack of the invention is shown in FIGURES 1 to 4 and comprises a nonmetallic pack box or housing 10 formed of non-metallic materials, such as glass fibre reinforced plastic material of the thermo setting type, the outer half 11 of which is separable as a cover from the inner half 12 serving as a pack board. The inner half 12 is formed of an inner wall 13 serving as a mounting board terminating upwardly in a forwardly inclined portion 14 when supported on the back 15 of the wearer 16 in such manner as to provide a substantial space or gap 17 when supported on the wearer. A pack frame effectively forms an integral part of the inner wall 13 and consists of the lower forwardly extending frame part 18 of generally U-shaped form, preferably made of a rigid plastic laminate, and fastened to the pack wall 13 such as by rivets 19 or other suitable means. The side forwardly extending arm portions 20 and 21 carry a transversely extending pack strip 22 adapted to engage the lower back of the wearer, as indicated in FIGURE 2, to support the back wall 14 in spaced relation from the wearer. Preferably one side arm 20 carries an extended portion 23 having rigidly mounted thereon a levelling device 24 such as a spirit level 24 having a conventional spirit bubble tube 25 therein, enabling the operator to determine when the pack is level. This feature is important in the transmission of signals from the pack, as will be hereinafter disclosed in more detail. Relatively conventional cross-stripping 26 connecting from the forwardly extending arms 20 and 21 to the upwardly and forwardly extending strap plate 27 extending from the inclined wall portion 14 and formed of the same material and cemented thereto enables the operator to carry the pack of the invention in a substantially conventional manner, but providing the improvement of the air space 17 important for operator ventilation and comfort.

The inner wall 13 in its arched rectangular form embodies the integral side walls 28 carrying suitable fastening clasps 29 of the quick release type adapted for mounting of a conforming arched cover 11 formed of similar material and having matching side walls 30.

As shown in FIGURE 3 the inner wall 13 of the pack 10 carries the entire transmitting equipment, including an electromagnetic transmitter coil 31 and associated condenser 32, an oscillator 33, a plurality of wet storage cells of the silver-zinc type, preferably nine in number, of a total voltage output of 13.8 volts, such group of cells being designated by the number 34. A communications transceiver 35 of conventional construction is preferably embodied in the reconnaissance pack of the invention for assistance in mutual orientation of operators and is supported on the wall 13 such as in the location indicated in FIGURE 3; and connects to an earphone jack 36 on one of the side walls 12 for connection of earphone cable 37 for earphones 38 and microphone 39, as indicated in FIGURE 2. The receiver antenna may be of the flat wound type as indicated at 37a, disposed remote from the transmitter coil 31 and shielded therefrom by the storage cells 34. The transmitter circuit is triggered by a switch device 38a as will be discussed hereinafter in more detail connected thereto by cable 39a connecting to a jack 40 in one of the side walls 12. A charging socket 41 enables the connection of a large storage battery source to the storage cells 34 for charging of the same. The charging current is limited by the current limiting resistor 42. By this means operators may be delivered with complete equipment to an otherwise inaccessible point by aircraft, along with three six volt storage batteries of the conventional automotive type, the storage cells 34 will carry sufficient current supply for one day of normal reconnaissance and may be recharged overnight from regular storage batteries of the conventional type located at a base camp.

The transmitter is revealed in its circuit elements in FIGURE 4 and comprises a signal generating oscillator 33 of any wellknown type, preferably utilizing transistors for weight saving purposes, but having the transmitting coil serving as the lead therefor in novel manner and form as hereinafter disclosed. A battery source comprising the cells 34 energizes the primary winding 44 of transformer 45 upon actuation of switch 38a by the operator communicating to the centre tap 46. By way of example, the primary inductance is 463 millihenries on each side of the primary. The ends of the primary are connected to the base elements 47 and 48 of the PNP type transistors 49 and 50 respectively biased by resistors 51 and 52 to determine a satisfactory operating level. The resistors 51 and 52 may be typically of a value of 560 ohms. The secondary 53 of transformer 45 is of a ratio 1 to 28 with the primary and connects to emitters 54 and 55 of transistors 49 and 50 respectively, and further is connected to a herein identified primary portion between points 56 and 57 on transmitting coil 31, the latter having a secondary portion herein identified as the entire coil between the ends 59 and 60 connecting to the capacitor 32 in parallel therewith. The turns ratio primary to secondary is 1 to 70. Typical inductance of the primary may be 95 microhenries, and the secondary 965 millihenries. The Q-factor of the primary is typically 3.75, and of the secondary 110. The aim, therefore, is to achieve the highest possible Q-factor in this secondary of the transmitting coil for the particular frequency of operation, preferably of the order of about 1,000 cycles. The circuit elements of FIGURE 4 excepting components 31, 32, 34 and 38a are mounted on an aluminum extrusion 60a shown in FIGURE 9 and fastened to the back wall 13 to serve as a heat sink.

Figure 8:
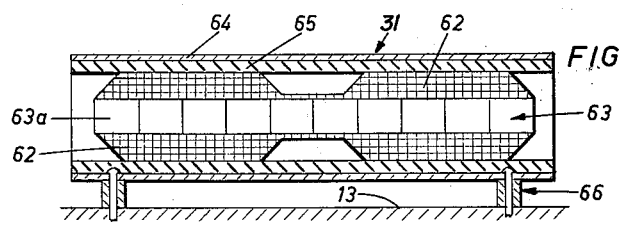
FIGURE 8 is a sectional view of the transmitting coil of the invention illustrating the manner of mounting the same in the housing of FIGURE 3.

The transmitting coil herein also sometimes referred to as the radiating coil or radiator is of novel construction as indicated in FIGURE 8, comprising a solenoid coil 62 wound about a ferrite core 63 formed of a plurality of compacted ferrite cylinders 63a cemented end to end. The turns of the coil are well insulated in accordance with high voltage insulating techniques, and the completed coil and core are supported as a unit within a rigid fibre tube 64 by suitable shock mounting medium 65, such as sponge rubber. The fibre tube 64 is mounted by bolts and spacers 66 to the inner wall 13 of the pack of the invention. The particular winding design of the solenoid 62 will be determined by the power output and frequency having regard to the typical inductance and quality figures above set forth. It is of interest to observe that the capacitor 32 determining the operating frequency should be of very high voltage rating. The circuitry and components outlined operate satisfactorily when utilizing PNP germanium power transistors designed for general use with a 12 volt power supply, type 2N173, manufactured by Delco Radio Division of General Motors Corporation of Indiana having proved particularly suitable.

Figure 6:
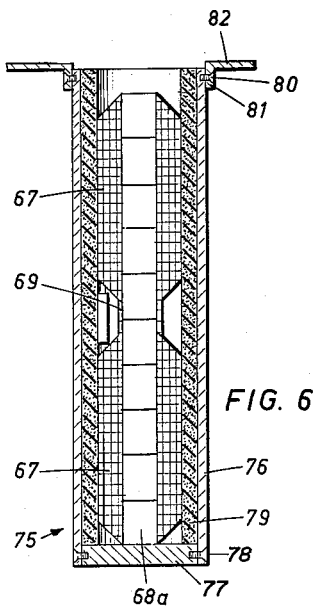
FIGURE 6 is a sectional view of the lower portion of the receiver of FIGURE 5.
Figure 7:
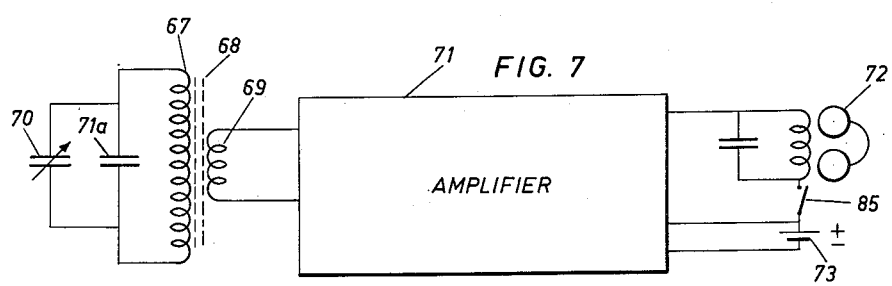
FIGURE 7 is an electric schematic of the receiver components of the receiver of FIGURE 5.

The receiver of the invention is illustrated in FIGURES 5 to 7. The electrical schematic shown in FIGURE 7 comprises a coil 67 having, for example, 9,000 turns of wire wound on a core 68 of a permeability greater than air, having a secondary coil 69 wound thereover intermediate the ends thereof of about 60 turns. Capacitors 70 and 71a enable the primary 67 to be tuned to preferred frequency of 1,000 cycles per second. The amplifier 71 of any suitable conventional form, such as a four stage transistor amplifier designated by TA-11 manufactured by Centralab, a division of Globe-Union Inc. of the State of Wisconsin, may be utilized to amplify the received signal for two head phones 72 having a gain of the order of 75 decibels at 25° centigrade at 1,000 cycles and adapted to be energized by a 1.3 volt mercury cell 73.

The receiver circuitry of FIGURE 7 is constructed into a portable receiver unit 74 shown in FIGURES 5, 6 and 7. The receiver coils 67 and 69 are preferably wound in solenoid form on a ferrite core 68a similar to core 63 of transmitter coil 31. The receiver coil structure 75 is supported within fibre tube 76 by base 77 fastened thereto by screws 78 and held in spaced relation to the tube by sponge rubber packing 79. Tube 76 is fastened by screws 80 to flange 81 in the bottom wall 82 of the receiver housing 83 containing amplifier 71 and battery 73 with capacitors 70 and 71a. Trimmer capacitor 70 is adjusted by knob 84. Switch 85 controls current flow from battery 73. A jack 86 is adapted for insertion of an earphone plug (not shown).

Figure 10:
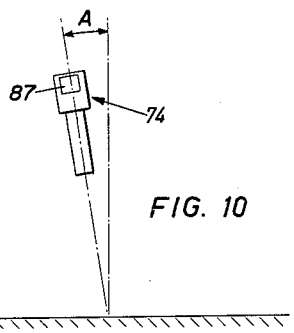
FIGURE 10 illustrates the use of the receiver.

A damped clinometer 87 of conventional construction is mounted in housing 83 and is utilized in known manner illustrated in FIGURE 10 to indicate a dip angle A at which minimum signal occurs.

In use the survey pack apparatus and receiver of the invention are each carried by an operator for continuous survey detection of ground conductors. While not specifically shown, it will be understood that the operator carrying the receiver will also carry a corresponding transceiver for oral communication with the transmitter operator. In this respect it is desired to point out that mutual orientation of the two operators for effective maximum signal strength oral communication will assist in mutual orientation of the operators in positions facing each other. The operators then being in alignment the transmitter may be levelled by observing the levelling device 24 while the survey pack remains on the back of the transmitter operator. A continuous signal may then be transmitted by the transmitter operator by depressing switch 38a (FIGURE 3). The receiver operator standing at a distance of the order of four hundred feet facing the transmitter tilts the receiver in the manner indicated in FIGURE 10 until a minimum signal audibility is detected at which the inclination indicated by the clinometer 87 may be noted. The receiver operator may then move laterally to reduce the dip angle A to zero and proceed further laterally to determine the effective limits of the ground conductor thus detected.

While a preferred structure and concept of the invention has been illustrated for the purpose of clarity, it will be understood that various modifications may be made. As contrasted with prior electro magnetic survey equipment necessitating the predetermined location of survey stations at which stationary set ups are employed for examination of conductors with heavy current signals, the invention provides light-weight unitary equipment adapted to be transported continuously by the operators, and to be utilized for conductor detection without lost time for stationary set up. The mobility of the survey apparatus thus afforded by the equipment of the invention enables the operators to establish and maintain optimum orientation with respect to the ground conductors being examined or sought, thereby achieving an optimum efficiency of terrain examination having regard to the power available. In effect, therefore, the reconnaissance electro magnetic survey equipment of the invention, though of lesser power than some prior equipment of the stationary set up type, nevertheless affords a facility of efficiency of examination comparable to, and in some instances substantially superior to, equipment of the prior art.

What I claim as my invention is:

1. A reconnaissance electro magnetic survey apparatus comprising, in combination: a pack in the form of an arched slab-like structure having a back wall including an upwardly and forwardly inclined portion, and a removable cover for sealing said pack; a pack frame of generally U-shaped form extending forwardly from said back wall, including means engageable with the back of an operator carrying said pack adapted to space the back wall from the back of the operator; strapping means extending from said frame adapted to pass about portions of the body of the operator for support of said pack thereby; an electro magnetic signal transmitter unit including a signal radiating coil, a transmitter and battery source therefor, disposed entirely within said pack; and a levelling device and means rotatably supporting said levelling device on said pack unit in a position forwardly thereof to dispose the same in front of an operator carrying said pack, whereby the operator may effect levelling of said pack while carrying the latter.

2. A reconnaissance electro magnetic survey pack comprising in combination: a rigid pack housing of generally slab-like form having a removable cover and formed substantially of non-metallic material; a back wall forming a part of said housing having an upper portion arching forwardly and upwardly toward the back of the operator supporting said pack; a pack supporting frame extending forwardly from said pack wall and including means for supporting the same on the body of an operator and effectively spacing the back wall from the back of the operator; a levelling device; and means forming a part of said frame and extending forwardly for rigid support of said levelling device in a location in front of the operator carrying said pack, whereby the operator may effect levelling of said pack.

3. A reconnaissance electro magnetic survey pack comprising in combination: a rigid pack housing of generally slab-like form having a removable cover and formed substantially of non-metallic material; a back wall forming a part of said housing having an upper portion arching forwardly and upwardly toward the back of the operator supporting said pack; a pack supporting frame extending forwardly from said pack wall and including means for supporting the same on the body of an operator and effectively spacing the back wall from the back of the operator; a levelling device; means forming a part of said frame and extending forwardly for rigid support of said levelling device in a location in front of the operator carrying said pack, whereby the operator may effect levelling of said pack; an electro magnetic signal generator including an energizing source therefor supported entirely within said housing; a signal radiating coil for said generator in the form of a winding supported on a straight high permeability core structure having a longitudinal axis effectively serving as the longitudinal axis of said winding; and means supporting said coil entirely within said housing in a position providing levelling of the axis thereof by said levelling device.

4. A reconnaissance electro magnetic survey pack comprising in combination: a rigid pack housing of generally slab-like form having a removable cover and formed substantially of non-metallic material; a back wall forming a part of said housing having an upper portion arching forwardly and upwardly toward the back of the operator supporting said pack; a pack supporting frame extending forwardly from said pack wall and including means for supporting the same on the body of an operator and effectively spacing the back wall from the back of the operator; a levelling device; means forming a part of said frame and extending forwardly for rigid support of said levelling device in a location in front of the operator carrying said pack, whereby the operator may effect levelling of said pack; an electro magnetic signal generator including an energizing source therefor supported entirely within said housing; a signal radiating coil for said generator in the form of a winding supported on a straight high permeability core structure having a longitudinal axis effecitvely serving as the longitudinal axis of said winding; means supporting said coil entirely within said housing in a position providing levelling of the axis thereof by said levelling device; and a communication transceiver disposed entirely within said pack and having an antenna located therewithin remote from said signal radiating coil, said batteries being located between said signal radiating coil and said antenna and serving effectively as a shield therebetween.

5. A survey pack as claimed in claim 4 in which said transceiver and transmitter embrace electronic amplifier components of the transistor type, and said energy source is provided in the form of a plurality of wet cells of the silver zinc type.

References Cited in the file of this patent
UNITED STATES PATENTS

| | | |
|---|---|---|
| 1,811,547 | Jakosky | June 23, 1931 |
| 2,008,201 | Chute | July 16, 1935 |
| 2,527,559 | Lindblad | Oct. 31, 1950 |
| 2,744,232 | Shawhan | May 1, 1956 |
| 2,748,386 | Polydoroff | May 29, 1956 |
| 2,794,949 | Hedstrom et al. | June 4, 1957 |
| 2,810,071 | Race | Oct. 15, 1957 |

OTHER REFERENCES

"Radio Engineering," by Frederick E. Terman, 1947, McGraw-Hill, New York, Third Edition (pages 725–729).

"Electromagnetic Waves and Radiating Systems," by Edward C. Jordan, 1950, Prentice-Hall, Englewood Cliffs, New Jersey (pages 328–337).